Figure 1:
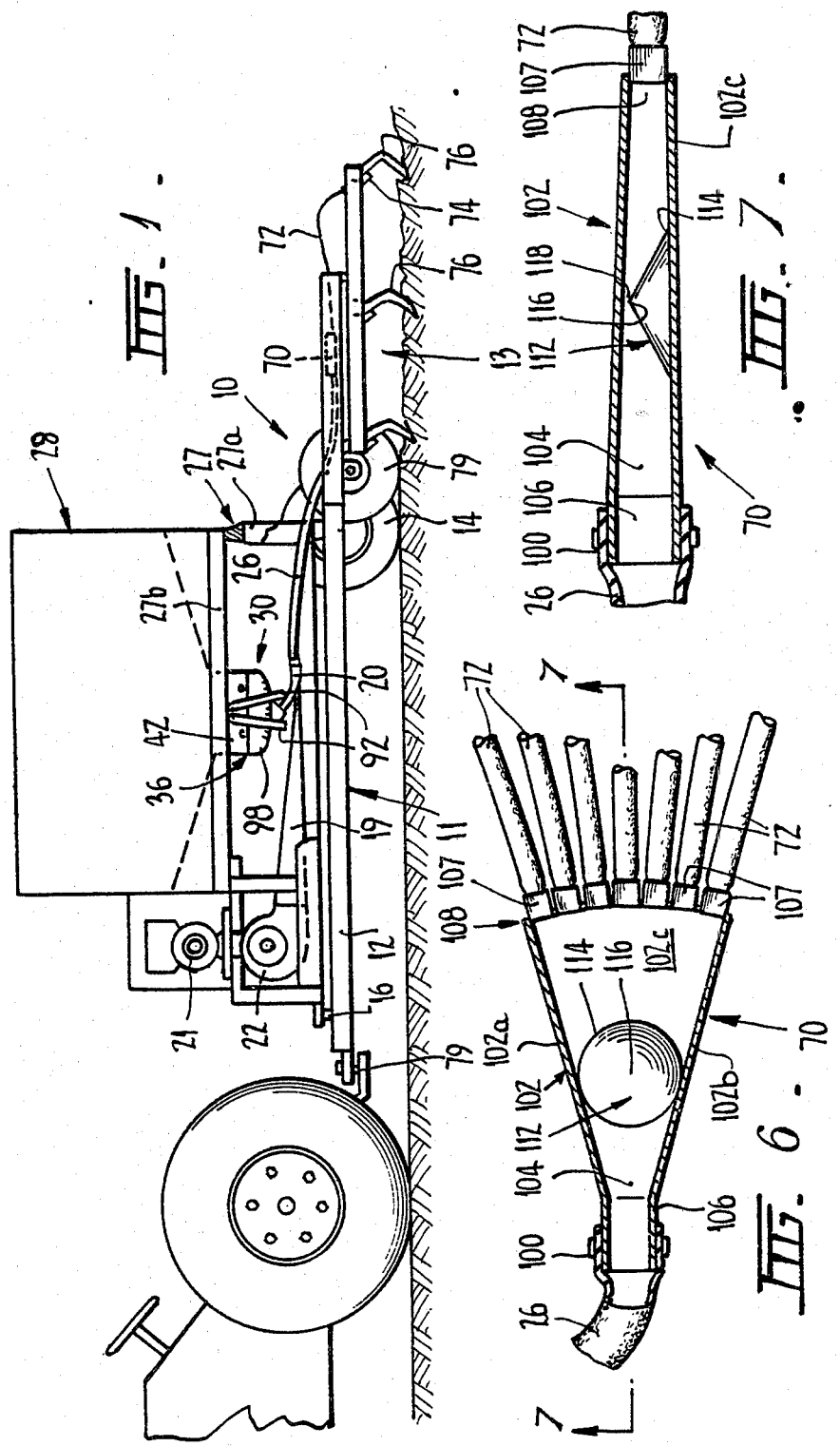

United States Patent [19]

Ryan

[11] 4,453,866
[45] Jun. 12, 1984

[54] FEEDING GRANULAR MATERIAL INTO A GAS STREAM

[75] Inventor: Austin T. Ryan, Warracknabeal, Australia

[73] Assignee: Doreen Rose Ryan, Warracknabeal, Australia

[21] Appl. No.: 239,707

[22] Filed: Mar. 2, 1981

[30] Foreign Application Priority Data

Mar. 3, 1980 [AU] Australia .............................. PE2625
Jul. 30, 1980 [AU] Australia .............................. PE4778

[51] Int. Cl.³ ...................... B65G 53/40; B65G 53/52
[52] U.S. Cl. ....................................... 406/70; 111/34;
222/283; 222/286; 222/328; 406/123; 406/130; 406/144; 406/181
[58] Field of Search ................... 406/70, 123, 39, 41, 406/119, 121, 130, 132, 133, 144, 181; 239/654; 222/238, 283, 285, 286, 328, 410; 111/34, 73, 77

[56] References Cited

U.S. PATENT DOCUMENTS

| 227,762 | 5/1880 | Glascock | 222/328 X |
|---|---|---|---|
| 1,850,937 | 3/1932 | Messinger | 406/181 |
| 3,189,230 | 6/1965 | Gillespie | 406/181 X |
| 3,402,684 | 9/1968 | Gradischer | 406/70 X |
| 4,296,695 | 10/1981 | Quanbeck | 406/123 X |

FOREIGN PATENT DOCUMENTS

| 2803889 | 8/1979 | Fed. Rep. of Germany | 239/654 |
|---|---|---|---|
| 594914 | 2/1978 | U.S.S.R. | 111/34 |

*Primary Examiner*—Jeffrey V. Nase
*Attorney, Agent, or Firm*—Ladas & Parry

[57] ABSTRACT

Apparatus for feeding granular material into a gas stream, for example seed or fertilizer into multiple airstreams of an agricultural vehicle, includes a receptacle for granular material, a duct for a gas stream, and a pair of resiliently compressible surfaces which contact or almost contact to define a nip between them. The surfaces may be provided by contrarotatable rollers and are disposed so that granular material may pass from one side of the nip through a port into the duct, and are moveable into the nip from the other side. The apparatus further includes metering means defining a controllable outlet from the receptacle and positioned with respect to the nip for feeding granular material into the nip from said other side at an adjustable controlled rate. Also disclosed is a distributor for gas-entrained granular material which includes a conical, part-conical or inverted conical surface in a diverging housing.

22 Claims, 7 Drawing Figures

FEEDING GRANULAR MATERIAL INTO A GAS STREAM

This invention relates, in one aspect, to the feeding of granular material into a gas stream and in such aspect has particular, though by no means exclusive, application to the feeding of grain or fertilizer into an airstream of a seeder or broadcaster. In a further aspect, the invention relates to the distribution of granular material borne by a single gas stream into several separated streams.

The entrainment of seed into airstreams for distribution to the sowing tines of a tractor-drawn seeder has proven less than wholly successful with lighter-weight seed, such as that of clover. In general, the high speed airstream tends to oppose successful entrainment of seed and, indeed, diversion of air into the seed stream prior to entrainment is not unknown. The lighter and/or smaller the individual seeds, the greater the difficulty, and various proposals have therefore been put forward for driving the seed into the stream. One such proposal is to pressurise the seed bin; another is to employ a rotary airlock valve to control seed supply to the airstream. However, where it is desired to entrain a mixture of seed and a fertilizer such as superphosphate, compression of the fertilizer may cause it to bridge or otherwise coagulate, thus clogging the seed supply line. All of these problems are magnified in the case of wideline seeders or seeder/broadcasters, in which air entrainment of the seed is especially attractive but which require a high initial air pressure and speed.

A further proposal to meet these difficulties is to feed the seed or fertilizer into a nip formed between a pair of oppositely rotating rollers. The granules are taken into the nip and directed on exit into the multiple airstreams. However, this arrangement remains susceptible to irregularity of supply and the rollers can easily be clogged. It is found that a substantial counteracting back pressure exists where the granules are simply dropped into each airstream and that there is uneveness of supply to the airstreams of a multiple set.

It is an object of the invention to provide a novel method of, and apparatus for, feeding granular material into a gas stream whereby to at least in part alleviate the aforementioned problems.

It has been realized, in accordance with the invention, that an effective approach is to provide for the granular material to be metered into a feed nip, and to divide the granular flow at the metering means rather than on entrainment. It is preferred to introduce the granular material into the gas streams by use of discrete venturi means for each stream.

The invention provides, in one aspect, apparatus for feeding granular material into a gas stream, comprising:

a receptacle for granular material;

a duct for constraining a gas stream;

a pair of resiliently compressible surfaces which contact or almost contact to define a nip between them, the surfaces being disposed so that granular material may pass from one side of the nip through a port into said duct and being moveable into the nip from the other side thereof; and metering means defining a controllable outlet from said receptacle and being positioned with respect to said nip for feeding granular material into said nip from said other side thereof at an adjustable controlled rate.

Preferably said duct is one of a plurality of ducts with associated parts arranged side by side, and said metering means comprises structure defining an array of multiple primary openings from said receptacle, which openings and ports are in register having regard to the direction of flow of granular material to the ducts in use of the apparatus. The metering means may further include a shutter mounted for sliding movement with respect to said openings to simultaneously vary their effective size, and control means to effect said movement of the shutter.

Advantageously, said apparatus further includes, between said metering means and said nip, a partition which is formed with a plurality of parallel slots in register with said primary openings and said ports having regard to said direction of flow of granular material to the ducts in use of the apparatus.

The or each duct preferably includes venturi means for introducing additional gas into the duct.

The resiliently compressible surfaces advantageously comprise the cylindrical surfaces of a pair of rollers which touch to form said nip and may be roughened to enhance engagement with the granular material.

For enhanced agricultural applications there may be a pair of receptacles for granular material and independent said metering means associated with each receptacle.

Once the seed and/or fertiliser is entrained in primary air streams of a wideline seeder/broadcaster the seed is carried by the primary streams to respective secondary distributors for conveyance to a multiplicity of delivery tubes or feet arranged adjacent the ground and often close behind respective cultivator tines. It is imperative that the distribution be on a uniform basis if uneven sowing of a crop is to be avoided.

In a second aspect of the invention, there is accordingly provided a distributor especially adaptable to distribution of gas entrained granular material into a plurality of individual gas streams, comprising:

a transversely closed housing defining a passageway which widens gradually in a direction from one end of the housing to another elongate end; and means defining a conical, part-conical or inverted conical surface in said passageway intermediate said ends of the housing, said surface facing said one end of the housing, the cone axis of the surface lying in a plane substantially normal to said direction and to the elongate dimension of said other end of the housing.

The invention will be further described, by way of example only, with reference to the accompanying drawings, in which:

FIG. 1 is a somewhat schematic, partly sectioned, side elevational view of an agricultural wideline seeder/broadcaster assembled from a feed unit and distributors in accordance with the different aspects of the invention;

FIG. 2 is a plan view of the assembly shown in FIG. 1;

FIG. 3 is a partial cross-section on the line 3—3 in FIG. 2, and depicts details of the feed unit forming part of the assembly of FIG. 1;

FIG. 4 is a partial cross-section on the line 4—4 in FIG. 3;

FIG. 5 is an exploded perspective view of the principal elements visible in FIG. 3;

FIG. 6 shows internal detail of a representative distributor of the assembly depicted in FIG. 1; and FIG. 7 is a cross-section on the line 7—7 in FIG. 6.

The seeder/broadcaster 1 illustrated in the drawings includes, as separate wheeled implements, a feed unit 11 and a rearward wideline frame 13. Unit 11 has a chassis 12 fitted with a pair of rear ground wheels 14 and with a forward hitch 16. An airline 18 comprises a plurality of side-by-side closed tubes 18a (eight as illustrated and typically between six and twelve) projecting rearwardly atop the chassis from a tapered manifold 19 to which air is supplied by a forwardly mounted blower 22. Blower 22 is coupled by a belt drive to an overhead motor 21 and is connected to manifold 19 to develop in tubes 18a equal, rearwardly moving primary airstreams which are injected into respective larger ducts 20. In use of the assembly these streams receive seed and/or fertiliser by way of a feed device 30.

Downstream of the feed device, ducts 20 terminate at discrete nipples 24 which detachedly mount individual flexible conduits 26. These conduits convey the primary seed-bearing airstreams to respective secondary distributors 70. From here, uniform secondary streams of seed-laden air, in this case seven streams per distributor, are conveyed along small diameter conduits 72 which terminate as delivery tubes or feet 74 immediately adjacent respective cultivation tines 76. Distributors 70 are fixed to rearward frame 13 atop individual supports (not shown) spaced across the frame, while tines 76 are suspended in offset rows from chassis 13, being typically biased downwardly by heavy coil springs (not shown). Frame 13 includes ground wheels 79 and draughting means comprising draw bars 78 and ties 78a which merge at a forward tractor hitch 79a. Unit 11 is hitched to frame 13 via hitch 16 and is so dimensioned that it is located above draw bars 78 with its ground wheels 14 between bars 78 and ties 78a.

Mounted atop chassis 12 on a generally rectangular stand 27 having end legs 27a and lengthwise joists 27b, is a seed/fertiliser bin 28 with forward and rearward storage compartments 28a, 28b, (FIG. 3) separated by an internal partition (not shown). Feed device 30 is disposed between the lower outlet of this bin and the ducts 20 for mixing the contents of compartments 28a, 28b if necessary and then feeding seed and/or fertiliser, in accordance with the invention, from bin 28 into the airstreams within ducts 20. By mounting bin 28, blower 22 and feed device 30 forwardly of ground wheels 14, the share of the weight load borne by these wheels is minimised, and is transferred through the hitch to the tractor. The pressure of wheels 14 on the underlying ground is thereby reduced, thus lessening undesirable compaction of the ground.

Figure 2:
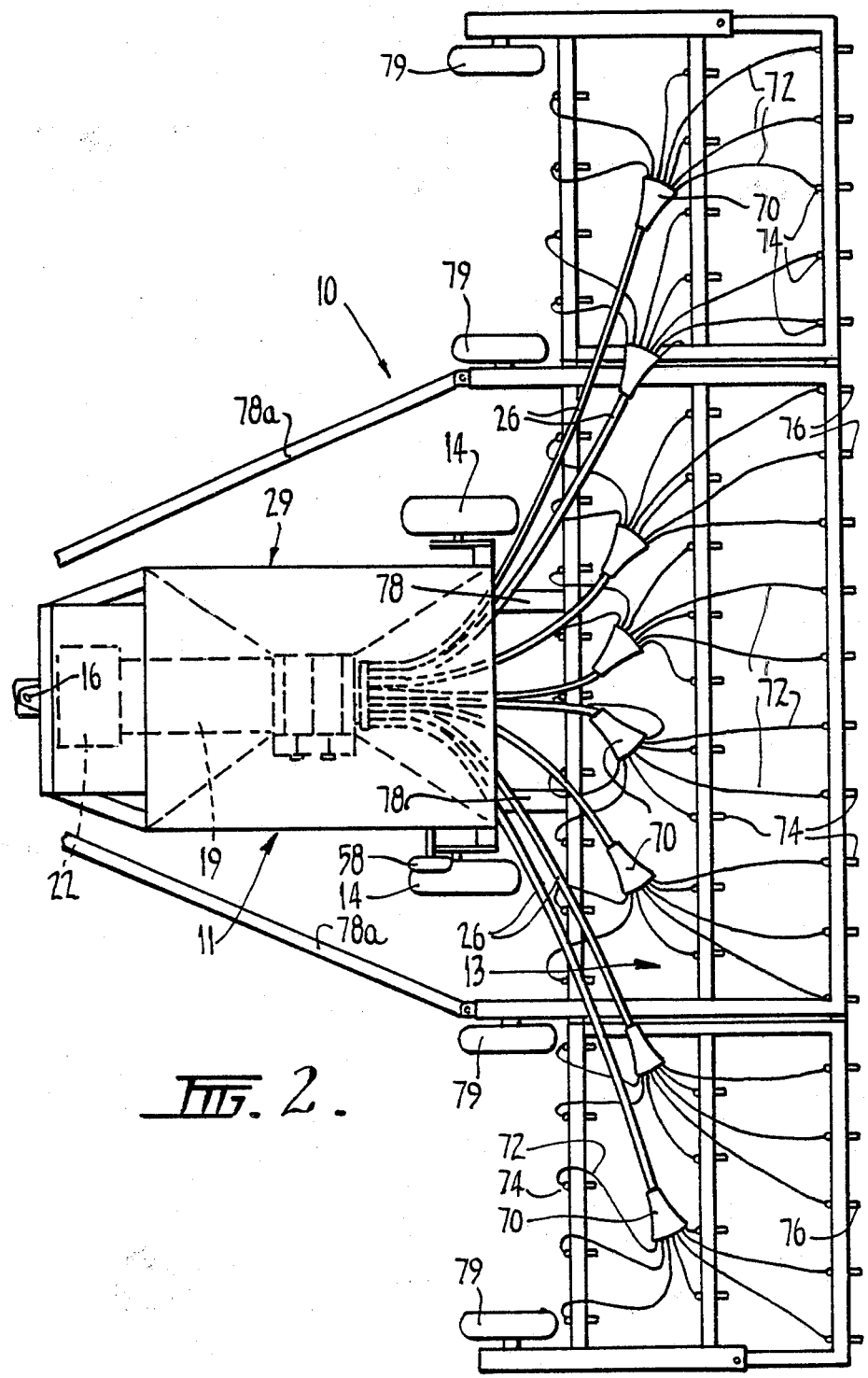

Device 30 includes (FIG. 3) a pair of oppositely rotatable rollers 32 each having an annular surface layer 33 of a resiliently compressible material, which may conveniently be plastics foam, foam rubber, insert rubber or the like. Rollers 32 are mounted within a close fitting casing 36 on axles 38 so that the plane containing the axles is horizontal. The rollers are so spaced that their cylindrical surfaces 34 just touch to define a nip 40 which receives seed/fertiliser falling from compartments 28a, 28b (by means to be hereinafter described) and from which the seed/fertiliser may fall through ports 52 to ducts 20. Rollers 32 are arranged to be oppositely rotated so as to move surfaces 34 into nip 40 from above, at a speed in direct proportion to the speed of ground wheels 14. This is achieved by a drive consisting of a small rear wheel 58 (FIG. 2, omitted from FIG. 1) supported by chassis 12 in friction driveable contact with one of ground wheels 14, and a chain 60 (FIG. 4) transmitting ground speed directly to the nearer roller 32 via sprocket 61 (FIG. 4) and oppositely to the further roller. The moving surfaces 34 thereby pick up the seed/fertiliser and pass it through the nip 40 towards port 51, at a rate proportional to ground speed.

Casing 36 is fixedly suspended from bin 28. It comprises end walls 42 (one visible in FIG. 4) and respective front and back walls 44, 45 (FIG. 3) which are both lined with rubber 44a, 45a in light contact with the surfaces 34 of their respective nearest roller. Walls 42 may also be rubber-lined if necessary, in contact with the ends of the rollers.

Figure 3:
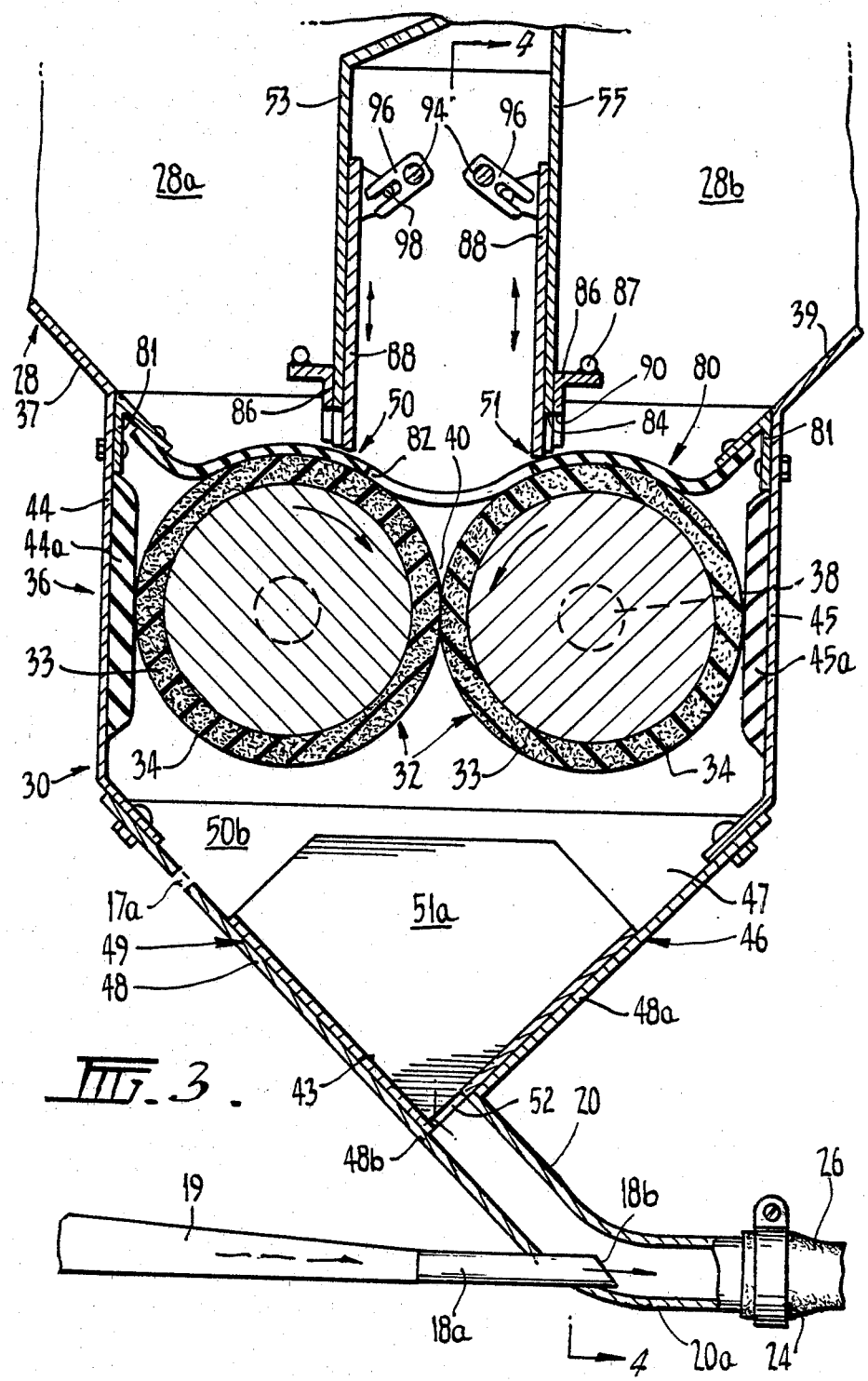
Figure 4:
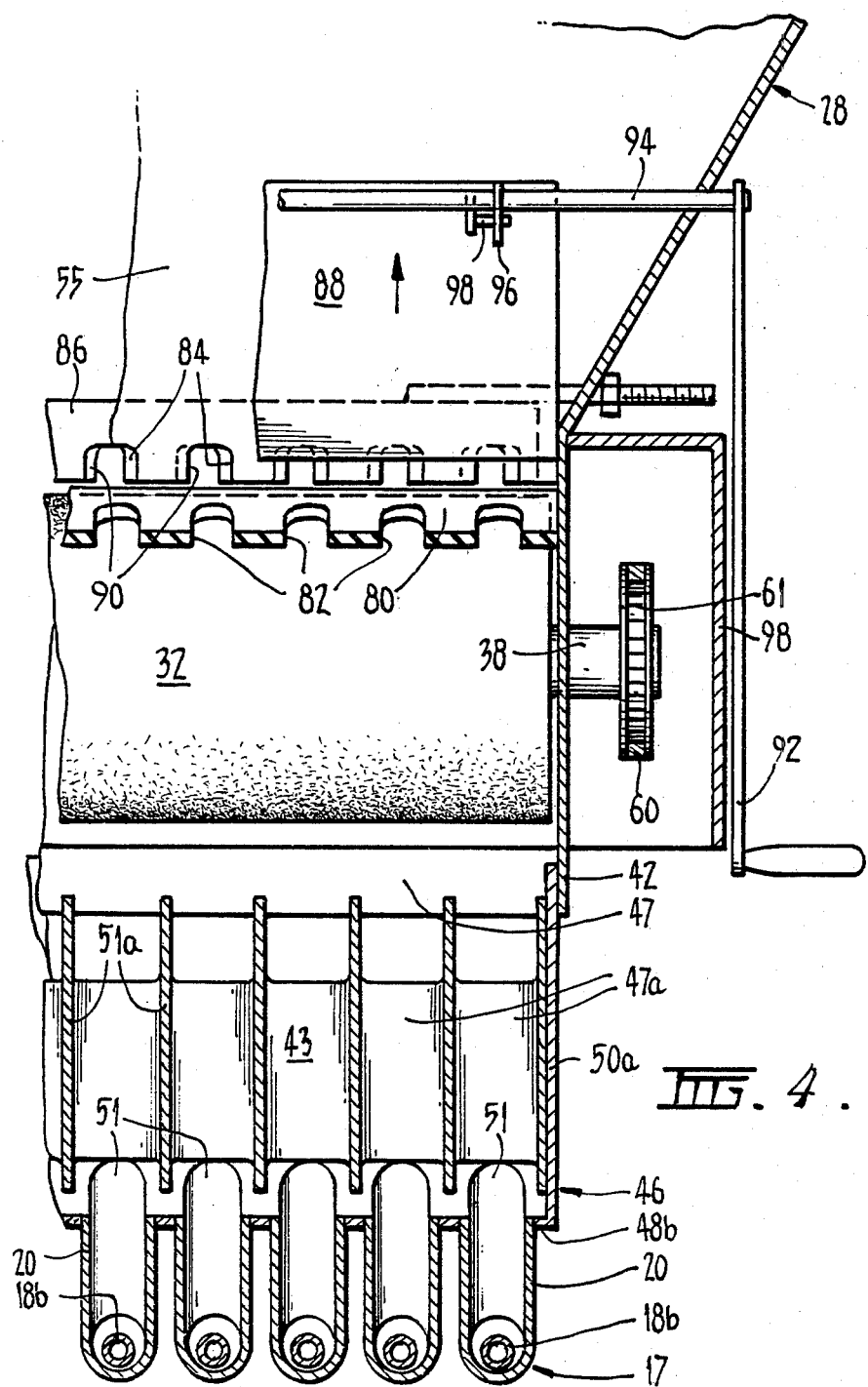
Figure 5:
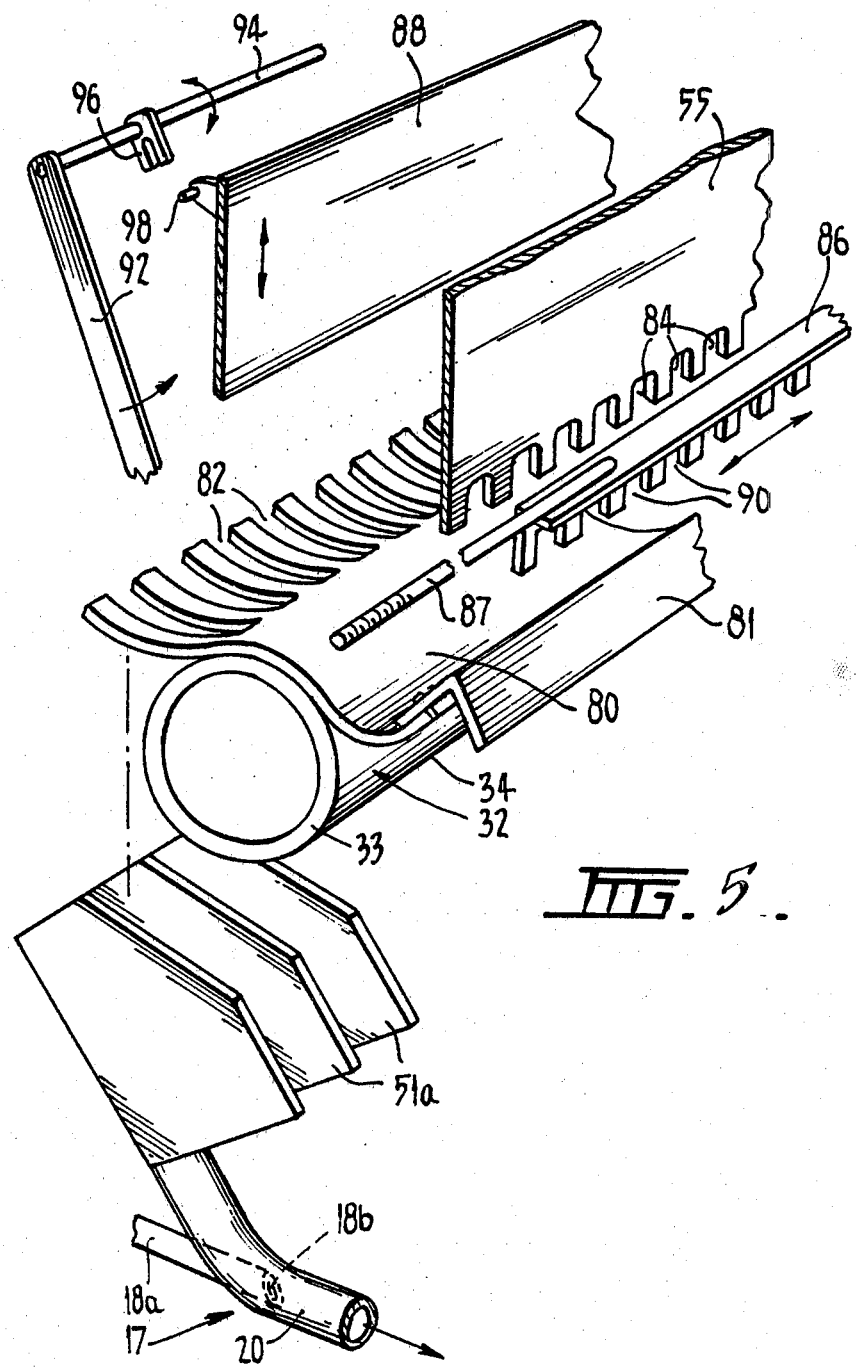

Attached to the underside of casing 36 is a housing 46 of triangular configuration. The attachment is depicted in FIG. 3 as a screw or rivet fastening to walls 44, 45, but it is preferable that the two parts be readily separable to permit cleaning and servicing of the device. By way of example, housing 46 might hook onto wall 44 at one side and be clamped into place at the other.

Housing 46 encloses chamber 47 and includes a pair of inclined walls 48, 48a which converge away from nip 40 to an apex ridge 48b. Ducts 20 open into chamber 47 at apex ridge 48a to define a linear array of ports 52. It will be noted that forward inclined wall 48 is contiguous with the lower edges of ducts 20 so that the axes of ducts 20 are inclined, at about 45°, to the direction of flow of the granular material from nip 40. One end wall, 50a, of housing 46 is welded to walls 48, 48a, but the other, 50b, is integral with a removable unit 49 which provides baffles 51a to divide chamber 47 into respective feed cavities 47a for ports 52. Baffles 51a and end wall 50b are fixed to a V-section slide 43 complementary to housing 46: end wall 50b may be detachably fastened to walls 48, 48a to hold baffle unit 49 in place, and yet permit its ready removal for cleaning or inspection.

Tubes 18a terminate at nozzles 18b which form restrictions at bends 20a in ducts 20. This provides respective venturi means at 17 by which air injected from nozzles 18b draws further air through apertures 17a in housing wall 48. Such is found to be very effective in entraining granules falling from nip 40 while minimising back pressure and turbulence. Each tube 18a is co-axial with the associated duct 20 downstream of nozzle 18b.

Above nip 40, slanted end walls 37, 39 of bin 28 converge downwardly inwardly towards respective metering means 50, 51 defining outlets from compartments 28a, 28b and positioned with respect to nip 40 for feeding granular material into the nip at an adjustable controlled rate. The centre partition of bin 28 is bifurcated at its lower end to form spaced vertical wall segments 53, 55 above the respective rollers 32. Segments 53, 55 respectively mount metering means 50, 51.

Wall segments 53, 55 are notched to form linear arrays of rectangular openings 84 (eight per array as illustrated) in vertical register with ducts 20, ports 52 and cavities 47a having regard to the direction of flow of granular material to ports 52. By "vertical register" is meant that granular material falling from an opening 84 will fall directly to a matching port 52 and duct 20 through a respective cavity 47. The other sides of openings 84 are closed by a flexible mat 80 that rests on and conforms to the uppermost portion of roller surfaces 34. Mat 80 is fastened to walls 44, 45 of casing 36 by linear brackets 81 and sags towards nip 40 between the rollers. This sagged portion is formed with slots 82 in vertical register with openings 84 and ports 52, and of similar breadth to openings 84. It will be noted that mat 80 forms the lowermost wall of the bin and seals of casing 36 to the outside of rollers 32.

The apertures 84 of each metering means 50, 51 are controlled by a pair of shutters 86, 88. Cross-shutter 86 is slidable, by rotation of an external nut on a threaded stud 87 welded to the shutter, across the inside of the openings 84 and defines a further array of openings 90 which match openings 84 in dimensions and placement. In this way, shutter 86 may be employed as a slidable screening device to vary the effective width of the individual openings 84 according to the desired sizes of the granules to be sown or broadcast.

Shutters 88 are of simple rectangular form and are slidable up and down (in tracks not shown) on the outside of wall segments 53, 55 to vary the effective vertical height of apertures 84 and accordingly the rate at which the contents of the respective bin compartment are fed to the nip 40. The mechanisms for adjusting shutters 88 include rotatable levers 92 accessible at the outside of one of casing end walls 42. Each lever 92 includes a spindle 94 which fixedly carries a transversely protruding bifurcated lug 96 (FIG. 3). Lug 96 engages a pin 98 on shutter 88 so that rotation of each lever 92 effects vertical sliding movement of the associated shutter. A graduated scale is marked on a cover plate 98 (FIGS. 1 and 4) depending from bin 28: the lever may be clamped at any selected position on the scale.

A number of optional features, not illustrated, will now be briefly discussed. Baffles 51a may be extended upwardly to define curved edges in close proximity to rollers 32. This modification might prove necessary in some cases to prevent turbulent conveyance of individual granules, especially small granules, to ducts other than those immediately below the granules' points of exit from nip 40. With smaller granules, or granules which are inclined to coagulate or which are to be metered out at a low rate, it is thought preferable to provide for roller surfaces 34 to be roughened, such as by elongate ribbing or by multiple fine nodules, preferably peaked. Finally, it may be desirable to provide for a horizontal shutter to slide over partition 80 and under wall segments 53, 55 to act as a lock gate for the bin when unit 11 is transported or stored with seed or fertilizer in the bin.

In use, the illustrated assembly is drawn behind a tractor over the land to be sown. Blower 22 is activated by motor 21 to fill manifold 19 and the motion of ground wheels 14 translated into mutually opposite rotation of rollers 32. Shutters 86, 88 are moved to control the rates of feed of the seed and/or fertilizer from the compartments of the filled bin 28, and to screen the size of granules passed to the roller nip. A metered amount of seed and fertilizer of refined granule size is thereby allowed to fall through slots 82 into nip 40, which takes the seed up and in turn directs it into chamber 47. Here the seed/fertilizer falls through cavities 47a to ports 52 and is entrained by the venturi-enhanced airstreams in ducts 20, air being ejected from manifold 19 at nozzles 18b and being drawn through apertures 17a. Because the surfaces 34 of rollers 32 are resiliently compressible, the seed is positively picked up and directed for entrainment into the airstreams but is not damaged: these criteria determine the thickness of surface layers 34. On the other hand the contact of surfaces 34 at nip 40 prevents both diversion of air into the seed stream and reversed travel of lighter seeds, such as clover, away from the airstream by turbulence.

The contact between the roller surfaces and both the walls 44, 45 of casing 36 and the mat 80 minimizes travel of air about the rollers to the vicinity of slots 82 and the supply side of the nip. The provision of metering means 50, 51 in advance of the nip ensures even flow without clogging or bridging. The presence of openings 84 and slots 82, and their vertical registration with cavities 47a and ports 52, is believed to assist in obtaining a uniform distribution of granules across all of the ducts 20.

Turning now to the structure of distributors 70, a representative distributor is depicted in detail in FIGS. 6 and 7. Each distributor includes a transversely closed metal housing 102 defining a passageway 104 which widens gradually and uniformly with an included angle between 30° and 40° from a forward, substantially square intake port 106 to a rearward, transversely elongate, arcuate exhaust port 108 of transverse dimension about 3.3 times the diameter of port 106. Housing 102 comprises diverging side walls 102a, 102b, a base wall 102c and a cover 102d, which is separable from the other side walls and which converges towards base wall 102c in the downstream direction. Provision (not shown) is made for ready release of the cover in order to service or check the distributor.

The respective supply conduit 26 is coupled to the intake port 106 by a round-to-square adapter piece 100 which is clamped onto the conduit and fastened about port 106. The individual conduits 72 feeding the delivery tubes 74 carry square metal spigots 107 and these are welded in a row into the exhaust port 108.

Located within housing 102 is means defining a conical obstruction 112 in passageway 104 intermediate ports 106, 108. The base rim 114 of this cone rests on and is welded to the inner surface of base wall 102c while its apex 116 is spaced from cover 102d by a clearance 118 which is small relative to the height of the cone. The cone axis lies in a plane which is normal to the direction of divergence of the housing and to the elongate dimension of exhaust port 108. The axis is also somewhat closer to intake port 106 to exhaust port 108. If convenient, the cone may be fixed to the underside of cover 102d rather than to base wall 102c.

Distributors constructed in this manner are found to ensure a very even distribution of seed borne by the primary airstream in conduit 26 among the secondary airstreams in conduits 72. The direction of seed flow about the conical surface of obstruction 102 generally normal to the axis of the cone rather than onto the conical surface parallel to this axis appears at present to be the effective operational feature. The conical surface need not be complete but may be part-conical, or indeed inverted conical. There may be more than one such surfaces, which may be supported from the cover rather than from the base wall of the housing.

I claim:

1. Apparatus for feeding granular material in a gas stream comprising:
   a receptacle for granular material;
   a plurality of ducts for constraining respective gas streams;
   a pair of resiliently compressible movable surfaces which contact or almost contact to define a nip between them, the surfaces being so disposed that granular material may fall from the nip into said ducts through respective ports in the ducts and being movable into the nip from above;
   metering means defining an array of controllable discrete openings from said receptacle and being positioned above said nip and lying adjacent one of said surfaces and displaced along said surface from the nip for feeding granular material into said nip at a controlled rate, and (means for controlling said openings by) a shutter mounted for sliding movement with a respect to said openings for simultaneously varying their effective size, and control means to effect said movement of the shutter; and means adjacent the metering means formed with a plurality of slots;

wherein said openings, slots and ports are in vertical register so as to define flow paths for respective streams of granular material.

2. Apparatus according to claim 1 wherein said control means comprises a manipulatably rotatable rod which fixedly carries a lug in engagement with a formation on the shutter whereby rotation of the rod causes said sliding movement of the shutter.

3. Apparatus according to claim 1 wherein said array is a linear array of rectangular openings, said shutter being arranged to vary the height of the openings.

4. Apparatus according to claim 3 further including a cross-shutter having a further array of multiple secondary openings which matches the first mentioned array and which is slidably mounted for varying the width of the openings of the first mentioned array.

5. Apparatus according to claim 1 wherein each duct includes venturi means including a nozzle for introducing gas into the duct.

6. Apparatus according to claim 5 further comprising blower means connected to supply air for ejection from each nozzle.

7. Apparatus according to claim 1 further including opposed walls defining a downwardly convergent chamber which lies between said nip and said ports and which is of triangular cross-section, said ports being formed in one or both of the walls at or adjacent the bottom of the chamber.

8. Apparatus according to claim 7 wherein each duct initially extends at an obtuse angle to direction of flow of granular material from said nip during use of the apparatus.

9. Apparatus according to claim 1 wherein said resiliently compressible surfaces comprise the cylindrical surfaces of a pair of rollers which touch to form said nip, drive means being provided to effect opposite rotation of the rollers.

10. Apparatus according to claim 9 wherein the cylindrical surfaces of said rollers are of plastics foam, foam rubbers, insert rubber, or the like.

11. Apparatus according to claim 9 wherein said rollers are housed in a casing which contacts the cylindrical surfaces of the rollers at selected locations to substantially prevent air passing from said stream around the rollers to the feed side of the nip.

12. Apparatus according to claim 9 wherein the axes of the said rollers are in a substantially horizontal plane and said openings are disposed substantially in a vertical plane atop one of the rollers.

13. Apparatus according to claim 12 wherein the axes of said rollers are in a substantially horizontal plane and said openings of the respective metering means are disposed substantially in vertical planes atop the respective rollers.

14. Apparatus according to claim 1, comprising a pair of receptacles for granular material and independent said metering means associated with each receptacle.

15. Apparatus according to claim 14 wherein said receptacles are provided as compartments of a single bin with a vertical partition separating the compartments, which partition is bifurcated at its lower end to form respective wall segments on which the metering means are provided.

16. Apparatus according to claim 14 wherein said resiliently compressible surfaces comprise the cylindrical surfaces of a pair of rollers which touch to form said nip, drive means being provided to effect opposite rotation of the rollers, and wherein the separate metering means for the two receptacles are disposed generally above the respective rollers.

17. Apparatus according to claim 1 constructed as a wheeled vehicle to be utilised as an agricultural seeder/fertiliser in which a multiplicity of said ducts feed multiple sowing shoes to the rear of said vehicle or on an accompanying vehicle.

18. Apparatus according to claim 1 further including opposed walls defining a downwardly convergent chamber which lies between said nip and said ports and which is of triangular cross-section, said ports being formed in one or both of the walls at or adjacent the bottom of the chamber, said chamber being provided with one or more baffles dividing at least the lower end of said chamber adjacent said ports into discrete cavities leading to the respective ports.

19. Apparatus according to claim 18 wherein the baffle(s) are commonly supported on a separate unit which may be slidably withdrawn from said chamber.

20. Apparatus according to claim 18 wherein the resiliently compressible surfaces comprise the cylindrical surfaces of a pair of rollers which touch to form said nip.

21. Apparatus according to claim 1 wherein said slots are formed in a partition between the metering means and nip, said partition being flexible and rests on the compressible surfaces with the portions thereof which separate said slots bridging said surfaces while sagging towards the nip.

22. Apparatus according to claim 1 further including a partition between the receptacle and said compressible surfaces defining respective slots adjacent and in register with said discrete openings.

* * * * *